US010573942B2

(12) United States Patent
Youngs et al.

(10) Patent No.: US 10,573,942 B2
(45) Date of Patent: Feb. 25, 2020

(54) FLUID BATH COOLED ENERGY STORAGE SYSTEM

(71) Applicant: Allison Transmission, Inc., Indianapolis, IN (US)

(72) Inventors: Daniel J. Youngs, Pittsboro, IN (US); Jorge E. Silva, Anderson, IN (US); Edward Bass, Chambersburg, PA (US)

(73) Assignee: Allison Transmission, Inc., Indianapolis, IN (US)

(*) Notice: Subject to any disclaimer, the term of this patent is extended or adjusted under 35 U.S.C. 154(b) by 640 days.

(21) Appl. No.: 14/845,848

(22) Filed: Sep. 4, 2015

(65) Prior Publication Data
US 2015/0380782 A1 Dec. 31, 2015

Related U.S. Application Data

(63) Continuation of application No. PCT/US2014/020572, filed on Mar. 5, 2014.
(Continued)

(51) Int. Cl.
*H01M 10/6568* (2014.01)
*H01M 10/625* (2014.01)
(Continued)

(52) U.S. Cl.
CPC ......... *H01M 10/6568* (2015.04); *H01M 2/30* (2013.01); *H01M 10/48* (2013.01);
(Continued)

(58) Field of Classification Search
None
See application file for complete search history.

(56) References Cited

U.S. PATENT DOCUMENTS 4,908,281 A * 3/1990 O'Callaghan ........... H01M 2/40
429/403
5,483,807 A * 1/1996 Abersfelder ....... B60H 1/00492
165/43
(Continued)

FOREIGN PATENT DOCUMENTS

CN 101641823 A 2/2010
CN 102496750 A 6/2012
(Continued)

OTHER PUBLICATIONS

Muller et al. (CN 202651316 U) with machine translation.*
(Continued)

*Primary Examiner* — Milton I Cano
*Assistant Examiner* — Haixia Zhang
(74) *Attorney, Agent, or Firm* — Woodard, Emhardt, Henry, Reeves & Wagner, LLP

(57) ABSTRACT

An energy storage system includes a container enclosing a battery cell array and having a fluid which surrounds the battery cell array. The system can include a refrigeration system to increase heat energy transfer from the battery cells. The system can include an external fluid loop configured to carry the fluid externally from the container through a heat exchanger. The system can also include a wall having a communication port which is configured to connect with an enclosure and convey electric signals through the wall.

17 Claims, 3 Drawing Sheets

Related U.S. Application Data

(60) Provisional application No. 61/781,406, filed on Mar. 14, 2013.

(51) Int. Cl.

| | | |
|---|---|---|
| *H01M 10/613* | (2014.01) | |
| *H01M 2/30* | (2006.01) | |
| *H01M 10/48* | (2006.01) | |
| *H01M 10/6556* | (2014.01) | |
| *H01M 10/6551* | (2014.01) | |
| *H01M 10/615* | (2014.01) | |
| *H01M 10/655* | (2014.01) | |
| *H01M 10/6567* | (2014.01) | |
| *H01M 10/617* | (2014.01) | |
| *H01M 10/6553* | (2014.01) | |
| *H01M 10/60* | (2014.01) | |
| *H01M 10/656* | (2014.01) | |
| *H01M 10/6552* | (2014.01) | |

(52) U.S. Cl.
CPC ....... *H01M 10/484* (2013.01); *H01M 10/486* (2013.01); *H01M 10/613* (2015.04); *H01M 10/625* (2015.04); *H01M 10/60* (2015.04); *H01M 10/615* (2015.04); *H01M 10/617* (2015.04); *H01M 10/655* (2015.04); *H01M 10/656* (2015.04); *H01M 10/6551* (2015.04); *H01M 10/6552* (2015.04); *H01M 10/6553* (2015.04); *H01M 10/6556* (2015.04); *H01M 10/6567* (2015.04); *H01M 2220/20* (2013.01)

(56) References Cited

U.S. PATENT DOCUMENTS

| | | | |
|---|---|---|---|
| 5,834,132 A | 11/1998 | Hasegawa et al. | |
| 6,106,972 A | 8/2000 | Kokubo et al. | |
| 6,309,774 B1 | 10/2001 | Buchner et al. | |
| 6,422,027 B1 | 7/2002 | Coates, Jr. et al. | |
| 6,481,230 B2 | 11/2002 | Kimishima et al. | |
| 6,772,603 B2 | 8/2004 | Hsu et al. | |
| 2006/0159991 A1 | 7/2006 | Takeshita | |
| 2006/0170218 A1* | 8/2006 | Grant | F02D 29/06 290/1 R |
| 2009/0068552 A1 | 3/2009 | Murata | |
| 2009/0233158 A1 | 9/2009 | Kimura | |
| 2009/0280394 A1 | 11/2009 | Takagi | |
| 2009/0317698 A1 | 12/2009 | Murata | |
| 2009/0321532 A1 | 12/2009 | Maitre | |
| 2010/0009246 A1 | 1/2010 | Maitre et al. | |
| 2010/0047682 A1 | 2/2010 | Houchin-Miller et al. | |
| 2010/0099015 A1 | 4/2010 | Kawai | |
| 2010/0104927 A1 | 4/2010 | Albright | |
| 2011/0020677 A1 | 1/2011 | Shin et al. | |
| 2012/0183830 A1 | 7/2012 | Schaefer et al. | |
| 2014/0312911 A1 | 10/2014 | Ding | |

FOREIGN PATENT DOCUMENTS

| | | |
|---|---|---|
| CN | 202651316 U * | 1/2013 |
| DE | 10 2010 013033 A1 | 9/2011 |
| JP | 09-213292 A | 8/1997 |
| KR | 10-2010-0041727 A | 4/2010 |

OTHER PUBLICATIONS

Australian Examination Report issued in Application No. 2014241798, dated Jan. 7, 2016, 4 pgs.
Australian Examination Report issued in Application No. 2014241798, dated Aug. 11, 2016, 5 pgs.
European Search Report issued in Application No. 14775314.9, dated Jul. 18, 2016, 8 pgs.
Chinese First Office Action issued in Application No. 201480007442.7, dated Mar. 2, 2017, 9 pgs.
European Examination Report issued in Application No. 14775314.9, dated Mar. 29, 2017, 5 pgs.
International Search Report and Written Opinion issued in PCT/US2014/020572, dated Jun. 26, 2014, 14 pgs.

* cited by examiner

FLUID BATH COOLED ENERGY STORAGE SYSTEM

CROSS REFERENCE TO RELATED APPLICATIONS

This application is a continuation of International Patent Application No. PCT/US2014/020572 filed Mar. 5, 2014, which claims the benefit of U.S. Provisional Application No. 61/781,406 filed Mar. 14, 2013, which is hereby incorporated by reference in its entirety.

BACKGROUND

Vehicles incorporating electric motors require high voltage energy storage systems in order to properly power the motor. High voltage often requires that multiple battery cells be electrically connected together in series. Battery storage cells, when charging or discharging generate heat due to chemical reactions within the cells, as heat generation is a byproduct of electricity generation. When multiple battery cells are contained in close proximity, the heat generated in each cell can become multiplicative throughout the system and can cause problems such as cell thermal runaway which can destroy the storage system. Additionally, for optimal energy efficiency, uniform temperature of the battery cells must be maintained. Thus it is necessary and advantageous for such systems to include a means to cool the battery cells.

Additional problems with high voltage battery cells are risks of corona or arc flash if an open circuit occurs or fires from ignition of vented gases. Further, salt fog and foreign particles can cause corrosion and unwanted electrical leakage current paths or short circuits to exist in the storage system.

Current designs use air cooling or liquid cooling built with manifolds and piping to remove excessive heat from the battery cells. Air cooling does not prevent salt fog or other corrosive materials from reaching the battery cells, even when a filter is used. Liquid cooling built with manifolds and piping may leak and cause leakage current paths to exist in the storage system. Additionally, these designs add volume to the storage system which causes problems with space-efficient original designs or hybrid retrofit applications.

Other designs incorporate a non-conductive fluid inside a casing that contains the battery cells. In some cases, the fluid may be made to move within the casing which increases heat energy transfer. These designs may reduce problems with arc flash, corona, and corrosion. However, these designs are difficult to service as the fluid must be drained or otherwise contained when servicing the battery cells or other components. Further, these designs still may not provide adequate heat energy transfer in order to avoid cell thermal runaway.

Thus, there is a need for improvement in this field.

SUMMARY

The energy storage system described herein addresses several of the issues mentioned above as well as others. The energy storage system includes a container enclosing a battery cell and a fluid having electrically insulative and thermally conductive properties which surrounds the battery cell which reduces or eliminates problems with arc flash, corona, and corrosion. The container may be hermetically sealed in order to further mitigate these problems. The energy storage system can include a refrigeration system which can cause heat energy transfer from the fluid to the exterior of the container. Use of such a refrigeration system can greatly to increase the rate of the heat transfer from the battery cells, which in turn reduces or eliminates the chance of thermal cell runaway or otherwise overheating of the battery cells. The energy storage system can include a recirculating pump which causes circulation of the fluid. The energy storage system can include an external fluid loop which carries fluid externally to the container and the recirculating pump can cause fluid to flow through the external fluid loop. The recirculating pump may be located within the container or along the external fluid loop. The energy storage system can include a heat exchanger positioned on the external fluid loop which causes heat energy transfer from the fluid to the exterior of the container. The refrigeration system can include an evaporator located within the container, or positioned along the external fluid loop. Cooling fins can be attached to the exterior of the container to further increase the heat energy transfer from the battery cells to the exterior of the container.

In other examples, the energy storage system can include a wall having a communication port which is configured to convey an electric signal through the wall while maintaining the hermetic environment of the container. An enclosure having terminals and a controller is configured to mate with the container and the communication port in order to receive and transmit electric signals. The enclosure and communication ports allow components of the energy storage system to be readily separated from the fluid for increased serviceability while maintaining the hermetic environment of the container.

Further forms, objects, features, aspects, benefits, advantages, and embodiments of the present disclosure will become apparent from a detailed description and drawings provided herewith.

DETAILED DESCRIPTION

Figure 1:
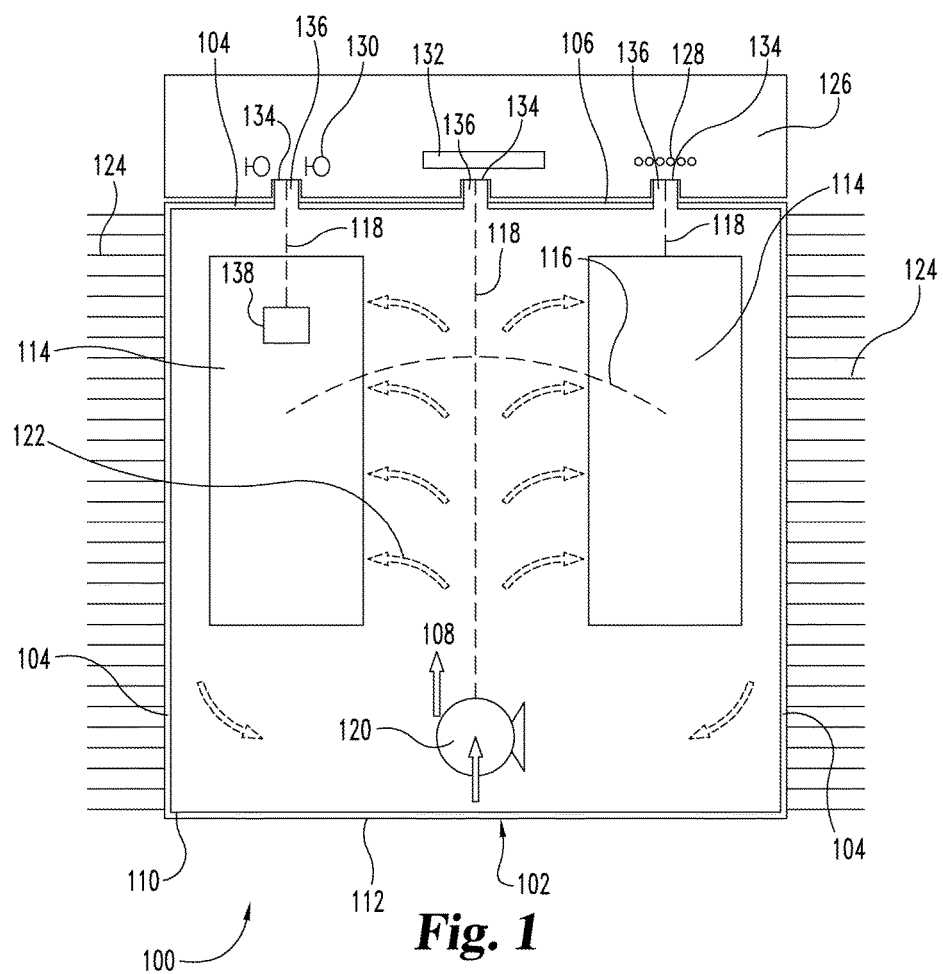
FIG. 1 illustrates a diagrammatic view of an energy storage system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. It will be apparent to those skilled in the relevant art that some features not relevant to the present invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

FIG. 1 shows an illustrative view of an energy storage system 100. The energy storage system 100 is adapted for use in hybrid vehicles as well as other types of vehicles or transportation systems but it is envisioned that various aspects of the energy storage system 100 can be incorporated into other environments. In the context of a hybrid vehicle, the energy storage system 100 receives electrical energy which is generated by an electric motor/generator (not shown). The energy storage system 100 also conversely supplies energy to the electric motor/generator and also to other components such as an inverter, a DC-DC converter, or other components. The energy storage system 100 communicates with an electric motor/generator and other components through the use of high voltage wiring.

The energy storage system 100 includes a container 102 which provides structural support for the energy storage system 100. The container 102 includes a plurality of walls 104, a floor (not shown) and a lid (not shown). As depicted in FIG. 1, the container 102 forms a rectangular shape including four walls 104, with one wall 104 being formed as a bulkhead 106. The walls 104 provide structural support for the container 102. The seals between the walls 104, the lid, and the floor create a hermetically and fluidly sealed environment within the container 102. The walls 104, floor, and lid are mated with each other and sealed such that the container 102 can be filled with a fluid 108 while not allowing any fluid 108 to leak through the seals. The seals can be any seals which are generally known in the art and capable of withstanding volatile temperature variances and ranges and such as welds or polymer seals. Included in at least one wall 104 is a pressure relief valve (not shown). In the case of an increase of internal pressure beyond a target threshold, the pressure relief valve allows gas or fluid to be released from within the container and prevents cracking or other failure of the container 102. The pressure relief valve works in only one direction and does not allow external air or water inside the enclosure. Although the container 102 depicted in FIG. 1 is shown as a generally rectangular shape, the depiction is for illustration purposes only, and the container 102 could be formed as any of a variety of shapes.

The walls 104 have an inside surface 110 and an outside surface 112. The distance between the inside surface 110 and the outside surface 112 defines a thickness of the walls 104. The walls 104 are preferably constructed of a material having advantageous thermal properties such as aluminum, steel, magnesium, or other types of metals or non-metals. Preferably, the material has a high thermal conductivity such that any heat energy generated within the container 102 can be rapidly transferred from the inside surface 110 to the outside surface 112. Additionally, the walls 104 can be constructed of a material that has a high resistance to heat and that is structurally sound when undergoing extreme temperature variations or exposure to extreme temperature ranges.

Located within the interior of the container 102 are battery cell arrays 114. The battery cell arrays 114 are in essence linked groups of electrochemical batteries for storing energy generated by an electric motor/generator and rapidly supplying the energy back to an electric motor/generator. While the illustrated example shows the container 102 including two battery cell arrays 114, the energy storage system 100 can include more or fewer battery cell arrays 114 than are shown. The battery cell arrays 114 include individual battery cells which may be daisy chained together in series or parallel as required by the specific system (not shown). The battery cell arrays 114 are connected by data links 116 which provide an electrical connection and facilitate communication between the various battery cell arrays 114. The battery cell arrays 114 are electrically connected to the bulkhead 106 via data links 118. The data links 118, 116 can include any electrical connectors and signal carriers which are known in the art and suitable for transporting electrical signals in a variable-temperature environment. The electrical connectors and signal carriers which are part of data links 118, 116 can include physical components which protrude from or are fastened to the battery cell arrays 114.

The individual battery cells of the battery cell arrays 114 include battery walls that seal the internal components of the battery cells such that any fluid or air cannot penetrate the battery walls and compromise the internal integrity of the battery cells and correspondingly the battery cell arrays 114. The battery walls are generally constructed from a material such as aluminum or other metal or non-metal having high thermal conductivity such that heat energy generated within the battery cells can be rapidly transferred to the exterior surfaces of the battery walls.

The container 102 contains the fluid 108 which is located in the interior of the container 102. The fluid 108 directly contacts the inside surfaces 110 of the container 102, the battery walls, the bulkhead 106, the electrical connectors and signal carriers which are part of the data links 118, 116, and any other components located within the container 102. Because the interior of the container 102 is sealed, the fluid 108 cannot escape from within the container 102. The fluid 108 is of sufficient quantity to cover and fluidly surround the battery cell arrays 114 and the data links 118, 116. In this way, oxygen is effectively removed from around the battery cell arrays 114 and the data links 118, 116 and no flame can exist or be created around the battery cell arrays 114 and the data links 118, 116. This reduces or eliminates the danger of igniting any vented gases. It also reduces the chance of an arc flash or corona if an open circuit occurs within the energy storage system 100. Further, the submersion of the battery cell arrays 114 and the data links 118, 116 eliminates oxygen from around the electrical components which reduces the chance of corrosion caused by moisture or oxygen. Additionally, the fluid 108 isolates the battery cells electrically better than air gaps. The fluid 108 is preferably an electrically insulative fluid such that there is no risk of a short circuit within the energy storage system when electrical components are submerged within the fluid 108. Additionally, the fluid 108 is a fluid having a balance of high electric insulation properties and high thermal conductivity for increased heat energy transfer rates within the container 102. Such fluids are known in the art such as for example certain types of oils such as transformer oil or transmission oil. Additionally, the fluid 108 could be a phase change material having an increased capacity to absorb heat during phase changes. The container 102 could be filled substantially with the fluid 108, leaving little or no air space left inside the container 102. Alternatively, the container 102 could be constructed whereby the battery cell arrays 114 and the data links 118, 116 do not reach the lid of the container 102 such that the battery cell arrays 114 and the data links 118, 116 are submerged in the fluid 108 even while the container 102 is not completely filled with the fluid 108.

Located within the container 102 is a recirculating pump 120. The recirculating pump 120 causes the fluid 108 to circulate throughout the container 102. The recirculating pump 120 is shown in FIG. 1 as being located at a proximal end of the container 102. However, the depiction is for illustration purposes only, and the recirculating pump could be located in other parts of the container 102. The recirculating pump 120 can be a positive displacement pump which converts external power to motion of a pump mechanism and causes fluid to flow through an inlet and outlet. Alternatively, the recirculating pump 120 could be a basic propeller that converts rotational motion into forced fluid flow or any of a variety of mechanisms which are suitable for causing fluid circulation within the container 102. The recirculating pump 120 can also be any of a variety of suitable mechanical devices which cause fluid movement and which are known in the art. The recirculating pump 120 circulates the fluid 108 throughout the interior of the container 102 such that the fluid 108 is circulated at a generally uniform circulation rate along a fluid flow path 122 throughout the interior of the container 102 (the fluid flow path 122 is generally illustrated in FIG. 1 as dotted arrows as well as in FIGS. 2 and 3). The recirculating pump 120 is electrically connected to the bulkhead 106 via data links 118.

The fluid flow path 122 as illustrated in FIG. 1 follows a line which runs generally through a central channel between the two battery cell arrays 114 from a proximal end of the container 102 towards a distal end of the container. The fluid flow path 122 separates and continues on either side of the container to move around or through the battery cell arrays 114 and from there the flow path travels near the inside surfaces 110 back towards the proximal end of the container 102. Because the battery cell arrays 114 are comprised of individual battery cells, the fluid flow path 122 could flow between the individual battery cells such that the fluid 108 passes directly across the battery cell walls.

A plurality of cooling fins 124 are attached to the outside surface 112 of one or more of the walls 104. In the illustration of FIG. 1, the cooling fins 124 are attached to two of the outside surfaces 112. However, the energy storage system 100 could include cooling fins 124 arranged in a variety of configurations located on one or more of the walls 104 as well as externally on a floor or lid of the container 102. The cooling fins 124 are generally constructed as an array of substantially flat planar structures. The cooling fins 124 are positioned parallel to each other and are attached perpendicularly to the outside surfaces 112. The cooling fins 124 have a large amount of surface area to maximize convective heat energy transfer rates. The cooling fins 124 are formed from a material having high thermal conductivity such as aluminum or other metals or non-metals. The use of cooling fins to increase convective and conductive heat energy transfer rates is known to persons skilled in the art.

One of the container walls 104 is configured as a bulkhead 106. The bulkhead 106 maintains the hermetically sealed environment of the interior of the container 102 while providing an electrical communication link between the interior of the container 102 and the exterior of the container 102. A mating enclosure 126 is configured to mate with the container 102, and more specifically with the bulkhead 106. The mating enclosure 126 is configured to be attachable to the bulkhead 106 and easily removable for servicing or configuration tasks. The mating enclosure 126 can attach to the bulkhead 106 using bolts, levers, ratchets, or any of a variety of attachment mechanisms. The mating enclosure 126 contains a variety of controllers 128, terminals 130, and fuses 132. The terminals 130 facilitate data connections and high voltage power links between the electric energy storage system 100 and components external to the electric energy storage system 100 such as for example an electric motor/generator, inverter, DC-DC converter, or other components which may be part of an electric hybrid vehicle.

The enclosure 126 includes one or more receiving portions 134 which are configured to accept one or more communication ports 136 which are located in the bulkhead 106. The receiving portions 134 contain the terminals 130 which are configured to mate with corresponding terminals located in the communication ports 136. When mated together, the receiving portions 134 and communication ports 136 create a data connection whereby electric signals and electric power can be transferred from within the interior of the container 102 to or through the enclosure 126. The mating enclosure 126 is configured to be separable from the container 102 while not compromising the sealed integrity of the interior of the container 102 such that no fluid may escape from within the container 102 while servicing any component located within the mating enclosure 126. When the mating enclosure 126 is removed from the container 102, the bulkhead 106 remains and maintains the sealed integrity of the interior of the container 102.

The receiving portions 134 are illustrated in FIG. 1 as recessed portions of the enclosure 126. The communication ports 136 are illustrated in FIG. 1 as protruding portions of the bulkhead 106. However, these depictions are illustrative only and the configuration of the receiving portions 134 and the communication ports 136 could be any of a variety of suitable configurations. Additionally, although three receiving portions 134 and three communication ports 136 are illustrated in FIG. 1, this is illustrative only, and more or fewer receiving portions 134 and communication ports 136 could be incorporated in the energy storage system 100. The communication ports 136 receive the data links 118 which terminate in a contact configured to connect with a mating contact in the receiving portions 134. In this way, the communication ports 136 directly connect the data links 118 to the controller 128 via the terminals 130 of the mating enclosure 126. The communication ports 136 provide a seal around the data links 118 and terminals 130 in order to maintain the hermetic integrity of the interior of the container 102 such that no fluid 108 may pass through the communication ports 136. The terminals 130 and seals of the communication ports 136 can be any of a variety of terminals 130 and seals which are known in the art and suitable for variable temperature environments such as compression seals, o-rings, or polymer seals for example. The bulkhead 106 can be coated with a thermally insulating layer or constructed of a thermally insulating material such as ceramic for example in order to reduce temperature variations of the communication ports 136.

Located within the container 102 are one or more sensors 138. Although FIG. 1 depicts a single sensor 138 for illustration purposes, in practice the energy storage system 100 could include any number of sensors 138 positioned in a variety of configurations within the container 102. The sensors 138 can be connected to the battery cell arrays 114 or otherwise placed within the container 102. The sensors 138 can be any of a number of sensors for measuring physical parameters within the container 102 such as for example the temperature of battery cells, the temperature of the walls 104, or the temperature of the fluid. Additionally, the sensors 138 could be pressure sensors, liquid level sensors, and battery cell voltage sensors. The sensors 138 are electrically connected with the bulkhead 106 via the data links 118.

The mating enclosure 126 includes the controller 128 which acts as a battery management system. The controller 128 includes control commands to facilitate data transfer and power flow between the various components of the electric energy storage system 100 as well as between the energy storage system 100 and external components such as an electric motor/generator, inverter, or DC-DC converter. Additionally, the controller can be positioned at a variety of locations external to the mating enclosure 126 and electrically connected externally to the mating enclosure 126. The controller receives information from the sensors 138 and controls the recirculating pump 120 or other components of the energy storage system 100 to regulate the temperature of the battery cells or other parameters within the container 102. The sensors 138 are configured to provide information to the controller 128 located in the mating enclosure 126. The controller 128 receives information from the sensors 138 through the data links 118. The controller 128 also communicates with the recirculating pump 120 and any other components located in the container 102 through the data links 118. The controller 128 controls operation of the recirculating pump 120 and any other components located within the energy storage system 100. The controller 128 receives information from the battery cell arrays 114 such as voltage and capacity information through the data links 118 and can convey that information to an electric motor/generator or other component which is part of a hybrid vehicle. The controller 128 also facilitates electrical power transfer to and from the battery cell arrays 114 via the data links 118.

In an alternative embodiment, the mating enclosure 126 could be fixedly attached to the container 102. In this way, the mating enclosure 126 would not be detachable from the container 102. Instead, the mating enclosure 126 and the variety of controllers 128, terminals 130, and fuses 132 would be serviceable and configurable while attached to the container 102. Alternatively, the mating enclosure 126 could be an integral component of the container 102 such that the mating enclosure and container 110 share or partially share at least one wall 104. In this way, the mating enclosure 126 and a compartment housing the fluid bath could be two compartments of the same container.

It will be appreciated by those skilled in the art that high-voltage battery cells daisy-chained together in close proximity can generate a substantial amount of heat energy when charging or discharging. The heat energy buildup within the battery cell arrays 114 causes heat energy to be conductively transferred to the individual battery walls. In this way, at various times during operation of the energy storage system 100, if no heat energy management system is in place, the battery cells and battery walls could reach substantially high temperatures and cause catastrophic failure to the system. For example, cell thermal runaway could occur when rising temperatures of a battery cell causes a chemical reaction that results in further heat energy release within the battery cell. Further, the heat energy from one battery cell undergoing cell thermal runaway could spread to adjacent battery cells, subsequently causing an increased temperature in the adjacent battery cells. In this way, a chain reaction of multiple failing battery cells within the energy storage system 100 could occur. A battery failure could cause gas to be released from the battery cell into the container 102, increasing the internal pressure of the sealed container 102. If the internal pressure increases beyond a pre-determined threshold, the pressure relief valve activates and prevents further failure of the energy storage system 100. However, the pressure relief valve is a backup system only, as the energy storage system 100 illustrated in FIG. 1 provides a means for rapid and efficient heat energy transfer from the battery cell arrays 114 to the exterior of the container 102, thereby preventing an overheating scenario.

As will be appreciated by those skilled in the art, the rate of heat energy transfer by conduction between two points is directly proportional to the temperature difference between the two points and the thermal conductivity of the medium through which heat energy is being transferred. The rate of heat energy transfer by convection from one medium to another is directly proportional to the surface area of the medium from which heat energy is transferred as well as the temperature difference between the two mediums. As heat energy will always flow from a higher temperature to a lower temperature, the energy storage system 100 is designed to increase heat energy transfer from the battery cells to the exterior atmosphere surrounding the container 102 when the temperature of the battery cells is greater than the temperature in the exterior atmosphere.

The energy storage system 100 is designed to efficiently increase the conductive and convective heat energy transfer rate from the battery cells to the exterior of the container 102 by utilizing sub-systems, materials, and structural layouts within the energy storage system 100. Generally, efficient heat energy transfer is achieved according to the example illustrated in FIG. 1 by the following features. The battery cell arrays 114 are positioned in a fluid bath including the fluid 108 having high thermal conductivity which increases heat energy transfer from the battery cell walls to the fluid 108. The fluid 108 is caused to circulate within the container 102 in order to increase the convection heat energy transfer rates from the battery cells to the fluid 108, and from the fluid 108 to the walls 104. The container walls 104 have a high thermal conductivity which increases heat energy transfer from the fluid 108 to the outer surface 112. The cooling fins 124 are positioned on the outer surface 112 of the container walls 104 to conductively transfer heat energy from the container walls 104 and convectively transfer heat energy from the cooling fins 124 to the atmospheric exterior of the container 102.

More specifically, as heat energy is generated within the battery cells, the heat energy is transferred to the battery walls causing increased surface temperatures of the battery walls. Those skilled in the art will appreciate that the rate of heat energy transfer through a medium is directly proportional to the thermal conductivity of the medium. Accordingly, the temperature of the battery cells can be reduced or a target temperature of the battery cells can be maintained by causing the temperature of the fluid 108 to be lower than the target temperature of the battery cells. By submerging the battery cells in a fluid bath including the fluid 108 which is a lower temperature than the battery cells and which has high thermal conductivity, heat energy flows more rapidly from the battery walls to the fluid 108. The fluid 108 is advantageous compared to the alternative air because air has a much lower thermal conductivity than the fluid 108 which is generally greater than four times that of air. During operation of the energy storage system 100, if the fluid 108 is stagnant, the fluid 108 which abuts against the battery walls is generally of a higher temperature than the fluid 108 which abuts against the inside surface 110 as heat energy transfers from the battery cells through the fluid 108. Although the temperature difference between the battery walls and the inside surface 110 allows conduction heat energy transfer to occur through the fluid 108 at a relatively efficient rate, the addition of circulation of the fluid 108 can greatly increase the heat energy transfer rate. The flow of the fluid 108 along the fluid flow path 122 created by the recirculation pump 120 can exhibit characteristics of turbulent fluid flow which further enhances the rate of heat energy transfer within the fluid 108 as individual fluid particles exhibit additional transverse motion causing increased shear mixing within the fluid 108. The shear mixing results in a generally lower temperature of the portion of the fluid 108 which abuts against the battery walls 104 at any given moment, which further increases the heat energy transfer rate from the battery walls 104 into the fluid 108.

As heat energy is transferred to the fluid 108, the temperature of the fluid 108 tends to increase unless heat energy is transferred from the fluid 108 at a rate equal to the rate at which heat energy flows into the fluid 108. In order to avoid cell thermal runaway, the temperature of the fluid 108 should be maintained below a maximum temperature. In order to maintain a steady heat energy transfer rate from the battery walls 104 to the inside surface 110 through the fluid 108 while not allowing the temperature of the fluid 108 to rise, the temperature of the inside surface 110 should be maintained at a lower temperature than the mean temperature of the fluid 108. The temperature of the inside surface 110 is maintained through use of the walls 104 having high thermal conductivity and the cooling fins 124. Because the wall 104 is constructed of a material having a high thermal conductivity, the heat energy generated by the battery cells and transferred through the fluid 108 to the inside surface 110 will transfer rapidly through the wall 104 to the outside surfaces 112 when the outside surfaces 112 are maintained at a lower temperature than the fluid 108. The transfer of heat energy through the walls 104 will tend to raise the temperature of the outside surfaces 112. However, the temperature of the outside surfaces 112 can be maintained through use of the cooling fins 124. As heat energy travels through the walls 104, the heat energy subsequently conductively travels through the cooling fins 124 and is finally dissipated into the surrounding air through convective heat energy transfer from the surfaces of the cooling fins 124. The large surface areas of the cooling fins 124 facilitate rapid heat energy transfer from the cooling fins 124 to the surrounding air.

Accordingly, during operation of the energy storage system 100, the surface temperature of the cooling fins 124 is maintained at a lower temperature than the target temperature of the battery cells and the collective heat energy transfer rate from the battery cells to the ambient air surrounding the container 102 is increased. This improved heat energy transfer rate from the battery walls 104 to the external ambient air helps to reduce the chance of cell thermal runaway and otherwise overheating of the battery cells 114 by more rapidly conducting heat energy away from the battery cells.

Figure 2:
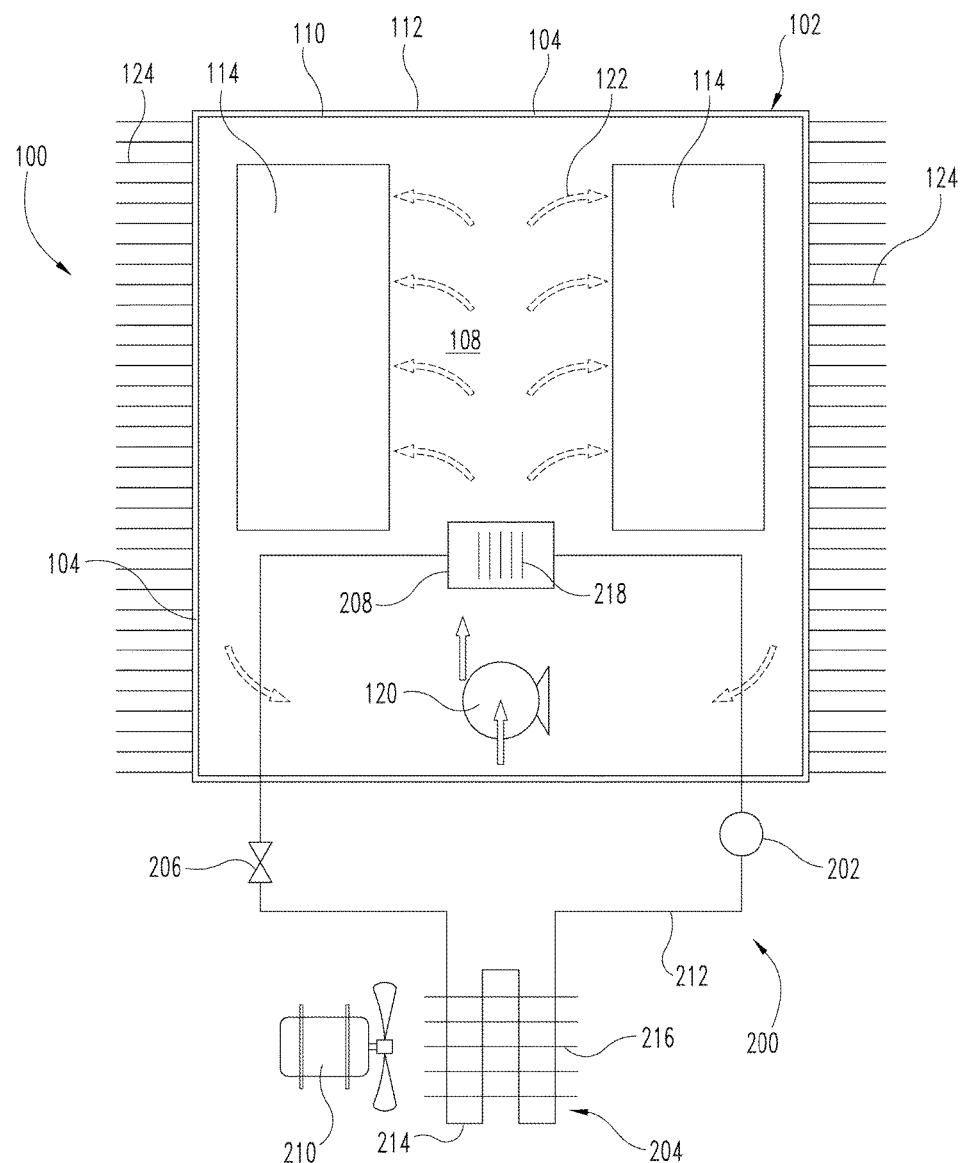
FIG. 2 illustrates a diagrammatic view of an alternative example of an energy storage system.

An alternative example of the energy storage system 100 is illustrated in FIG. 2 and includes a refrigeration system 200. The energy storage system 100 of FIG. 2 is similar to the energy storage system 100 of FIG. 1 and includes the container 102 with walls 104 having an outside surface 112 and an inside surface 110. Located within the container 102 is a pair of battery cell arrays 114, a recirculating pump 120, sensors 138, data links 118, 116 and a fluid 108. A plurality of cooling fins 124 is located on the outside surface 112. The energy storage system 100 shown in FIG. 2 can have any number of battery cells and is not limited to the two battery cell arrays 114 shown as in FIG. 2. The container 102 is filled with the fluid 108 which is a fluid having a high thermal conductivity and high electrical insulation properties. The recirculating pump 120 causes the fluid 108 to circulate within the container 102 through and about the battery cells.

The refrigeration system 200 includes a compressor 202, a condenser 204, an expansion valve 206, an evaporator 208, a cooling fan 210, and a refrigerant line 212. The configuration of the refrigeration system 200 shown in FIG. 2 is a depiction for illustration purposes only and is not necessarily intended to be representative of the actual physical layout of the refrigeration system. The refrigeration system 200 operates as a vapor compression cycle in which a refrigerant travels through the refrigerant line 212 through four components which are the compressor 202, the condenser 204, the expansion valve 206, and the evaporator 208. The refrigerant undergoes a thermodynamic transformation during each phase of the vapor compression cycle. The refrigerant can be any of a variety of substances which are suitable for use in a refrigeration cycle, such as ammonia or methane. The refrigerant has a boiling point which is below the target temperature of the fluid 108 such that the refrigerant will necessarily evaporate (or boil) during the evaporation phase when the refrigerant enters the evaporator 208.

The compressor 202 coincides with the compression phase of the vapor compression cycle and transforms the refrigerant from a vapor to a superheated vapor. The refrigerant enters the compressor 202 as a vapor through refrigerant line 212. The compressor 202 applies mechanical work to increase the pressure and temperature of the refrigerant. During the compression process the refrigerant is transformed from a vapor to a superheated vapor because little or no heat energy is transferred to or from the refrigerant. The compressor 202 can be any of a variety of compressors such as reciprocating compressors or rotary compressors. The compressor 202 can be mounted at any suitable location which is exterior to the container 102. However, it is desirable to position the compressor 202 at a location sufficiently distant from the container 102 to minimize any interference with the compressor 202 from expelled heat energy from the container 102. Additionally, the compressor should be positioned sufficiently close to the container 102 to minimize the length of the refrigerant line 212 and any corresponding efficiency losses.

Upon leaving the compressor 202, the refrigerant which is a superheated vapor enters the condenser 204. Within the condenser 204 the refrigerant is condensed and undergoes a phase change from a superheated vapor to a liquid which is still at a high temperature and pressure. The condenser 204 can be any of a variety of condenser types which are known in the art. For example, the condenser 204 can include a heat exchanger section in which the refrigerant travels through multiple snaking or looped condenser tubes 214. A plurality of condenser cooling fins 216 are attached to the condenser tubes 214. The cooling fan 210 blows external cooling air through the heat exchanger section and causes cooling air to pass across the condenser cooling fins 216. The cooling air convectively transfers heat energy away from the surface of the condenser cooling fins 216 and creates a temperature differential and which causes heat energy to conductively transfer from the refrigerant through the walls of the condenser. The refrigerant is maintained at a mostly constant temperature and constant pressure within the condenser 204. Although some temperature reduction occurs while the superheated vapor approaches a liquid/vapor phase combination, little further temperature loss occurs during the condensation phase. Because the temperature and pressure of the refrigerant are maintained at constant values (which are relatively high), as heat energy flows from the refrigerant, the refrigerant changes phase from a superheated vapor to a liquid. The high temperature, high pressure liquid refrigerant then exits the condenser 204 and passes through the expansion valve 206.

The expansion valve 206 controls the circulation flow rate of the refrigerant through the refrigerant line 212 and causes the refrigerant to slowly pass from a high pressure environment to a low pressure environment. The expansion valve 206 can be any of a variety of expansion valves that are known to control refrigerant flow into an evaporator, for example such as a thermostatic expansion valve or capillary tube. When passing through the expansion valve 206, the high pressure liquid refrigerant undergoes flash evaporation and the refrigerant becomes a liquid-vapor mixture. During flash evaporation, very little heat energy transfer occurs and the refrigerant rapidly cools as the temperature is generally directly proportional to the product of the pressure and volume. The resultant temperature of the liquid-vapor refrigerant is preferably below the median temperature of the fluid 108 as the refrigerant then continues along the refrigerant line 212 and into the container 102 which contains the evaporator 208.

Within the evaporator 208, the low-pressure, low-temperature refrigerant which is a liquid/vapor mixture is brought into sufficient contact with the fluid 108 for the refrigerant to absorb heat energy from the fluid 108. The evaporator 208 can be any of a variety of evaporators which are suitable for use in refrigeration systems, such as for example a series of wound evaporator coils 218 in which the refrigerant travels. The evaporator 208 is located directly within the container 102 and submerged within the fluid 108. The walls of the evaporator coils 218 are preferably made of a material having high thermal conductivity such as aluminum for example in order to maximize the heat energy transfer rate between the fluid 108 and the refrigerant. Within the evaporator 208, the refrigerant undergoes heat energy transfer with the fluid 108 through the conductive walls of the evaporator. Because the refrigerant temperature is lower than the mean temperature of the fluid 108, heat energy flows from the fluid 108 to the refrigerant. Because the refrigerant is at a low pressure, the refrigerant is able to boil at a low temperature, and the refrigerant becomes vaporized. Once vaporized, the refrigerant continues along the refrigerant line 212, exits the container 102 and returns to the compressor to complete the refrigeration cycle.

The recirculating pump 120 in the container 102 works in conjunction with the refrigeration system 200 to increase the heat energy transfer rate. By causing the fluid 108 to flow along the fluid flow path 122 shown in FIG. 2, the fluid 108 cannot become stagnant such that the portion of the fluid 108 directly surrounding the evaporator coils 218 would become generally lower in temperature than the mean temperature of the fluid 108. The recirculating pump 120 ensures that the fluid 108 which flows across the evaporator 208 is of sufficiently high temperature to maximize the heat energy transfer rate from the fluid 108 to the refrigerant travelling through the evaporator coils 218.

The refrigerant line 212 is configured to travel through the wall 104 and is sealed where it enters and exits the wall 104. The seals can be any type of seal known in the art such as polymer seals, o-rings, or compression seals for example. In this way, the interior of the container 102 is sealed to prevent external contaminants from entering the container 102 while allowing the refrigerant line 212 to enter and exit the container 102.

The refrigeration system 200 is a closed system such that the refrigerant cannot escape the refrigeration system. Accordingly, the refrigerant located within the refrigerant line 212 is sufficiently isolated from the fluid 108 such that the fluid 108 and the refrigerant cannot cross-contaminate one another. In this way, the refrigerant can be maintenanced or replaced through a portion of the refrigerant line 212 which is external to the container 102 while not causing contamination or compromising the internal seal of the container 102. Because the refrigeration system 200 requires energy to operate, in order to increase energy efficiency the refrigeration system 200 can be shut down when the refrigeration system 200 is not needed to maintain a sufficiently low temperature of the fluid 108. The refrigeration system 200 can be configured to communicate with the controller 128 (FIG. 1) which is also in communication with the sensors 138 such as temperature sensors, pressure sensors or fluid level sensors. The controller 128 acts as a battery management system and can be configured to activate the refrigeration system 200 in response to signals received from the sensors 138 such as during conditions of high temperature or pressure. Similarly, the recirculating pump 120 can be activated when needed by the controller 128 based on signals received from the sensors 138.

In an alternative embodiment of the energy storage system 100 (not shown), the refrigeration system 200 could be combined with a separate refrigeration system which is configured for the vehicle cab. It is known in the art for vehicles to have multiple evaporators in the same cooling circuit while sharing a common refrigerant source and compressor. This would prevent the need for multiple compressors which add undesirable cost.

Figure 3:
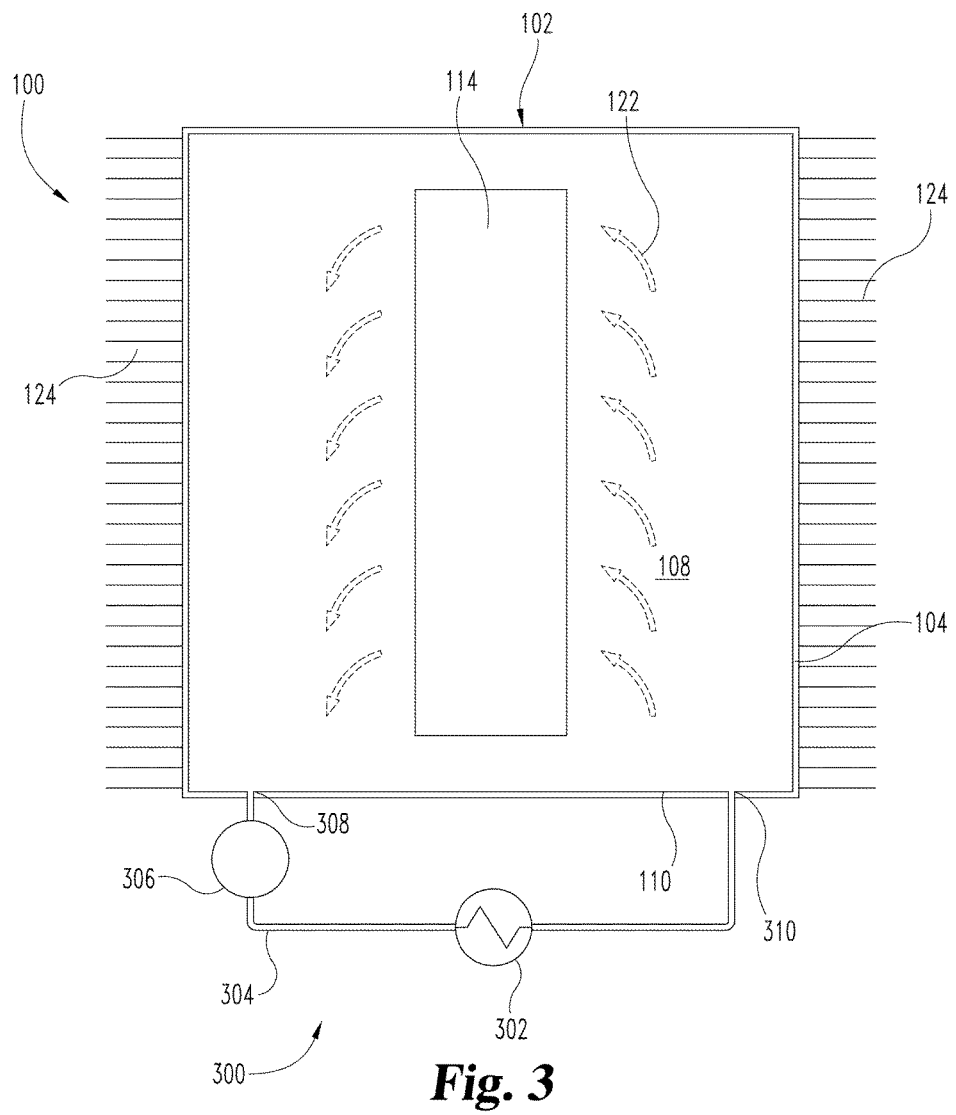
FIG. 3 illustrates a diagrammatic view of an alternative example of an energy storage system.

In another example of the energy storage system 100 illustrated in FIG. 3, the energy storage system 100 includes a fluid loop 300 which carries the fluid 108 through a heat exchanger 302 located outside of the container 102. The heat exchanger 302 could include any of a variety of heat exchangers such as one incorporating cooling fins and a cooling fan for example or any heat exchanger which is suitable for cooling a liquid. The energy storage system 100 depicted in FIG. 3 includes a single battery cell array 114. However, in other examples, the energy storage system 100 could include more than one battery cell array 114 and any of a variety of configurations of the battery cell arrays 114. The fluid loop 300 carries the fluid 108 outside of the container 102 through the heat exchanger 302. A fluid transport line 304 carries the fluid 108 through the fluid loop 300. A pump 306 causes the fluid to flow through the fluid transport line 304. The fluid transport line 304 is fluidly connected to the container 102 at an outlet portal 308 and an inlet portal 310. The outlet portal 308 and the inlet portal 310 are fluidly connected with the interior of the container 102 such that the fluid 108 can pass from the inside of the container 102 to the outside of the container 102 via the fluid transport line 304. The inlet portal 310 and the outlet portal 308 provide a sealed connection between the fluid transport line 304 and the interior of the container 102. The seals can be any type of seal known in the art such as polymer seals, o-rings, or compression seals for example.

The pump 306 causes the fluid 108 to flow through the fluid transport line 304 and into a heat exchanger 302. The heat exchanger 302 cools the fluid 108 before the fluid 108 continues to travel through the inlet portion 310 and back into the container 102. In this way, the fluid 108 travelling from the container 102 through the outlet portal 308 has a greater temperature than the fluid 108 travelling through the inlet portal 310 into the container 102. The cooled fluid 108 exiting the heat exchanger 302 enters the container 102 through the inlet portal 310 and flows along the fluid flow path 122 depicted in FIG. 3. The fluid 108 abuts against the battery cell walls of the battery cell array 114 where the fluid 108 absorbs heat energy from the battery cells. A portion of the heated fluid then enters the outlet portal 308 and continues along the fluid transport line 304 and into the heat exchanger 302, where the fluid 108 is once again cooled. In this way, the fluid loop 300 helps to reduce the temperature of the battery cells by reducing the temperature of the fluid 108 and causing heat energy to more rapidly flow from the battery walls into the fluid 108 due to an increased temperature differential between the battery walls and the fluid 108.

It should be noted that although the energy storage systems 100 previously described include specific features, any combination of the above features shown in the examples can be employed and are envisioned as part of the system described herein. For example, the bulkhead 106 and the enclosure 126 could be used in conjunction with the refrigeration system 200. Alternatively, the refrigeration system 200 could be used in conjunction with the fluid loop 300 and/or the enclosure 126 in an alternative example. In such an example, the refrigeration system 200 could have an evaporator 208 positioned within the container 102 as well as the fluid loop 300. As another example, the evaporator 208 could be located externally to the container and be used as the heat exchanger 302 or be used in addition to the heat exchanger 302.

It should also be understood that any of a variety of combinations of battery cell quantities and configurations could be employed as varying arrangements could further enhance heat energy transfer from within the battery cells to the fluid 108. It should be understood that a variety of configurations of the battery cell arrays 114 within the container 102 are envisioned that would facilitate rapid heat energy transfer from the battery cells into the fluid 108. For example, the battery cell arrays 114 could be configured in a diagonal fashion relative to the example illustrated in FIG. 1

While the invention has been illustrated and described in detail in the drawings and foregoing description, the same is to be considered as illustrative and not restrictive in character, it being understood that only the preferred embodiments have been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety to herein.

What is claimed is:

1. An energy storage system comprising:
    at least one battery cell;
    a container containing a liquid, wherein the container has at least one wall, wherein the at least one battery cell is contained within the container, and wherein the liquid surrounds the at least one battery cell;
    a recirculation pump positioned inside the container and submerged in the liquid;
    one or more communication ports defined by the at least one wall, wherein the one or more communication ports extend outwardly away from the container, and wherein the one or more communication ports each have an electrical connection passing through the at least one wall from inside the container to outside the container;
    a sensor within the container, wherein the sensor is electrically connected to one of the one or more communication ports and adapted to measure physical parameters within the container;
    wherein the at least one battery cell is electrically connected to one of the one or more communication ports by one of one or more data links; and
    wherein the recirculation pump is electrically connected to one of the one or more communication ports by one of the one or more data links, and wherein the data link connected to the recirculation pump is at least partially submerged in the liquid.

2. The energy storage system of claim 1, further comprising:
    an enclosure, wherein the enclosure has a receiving portion defined by a corresponding recessed portion of the enclosure, and wherein the recessed portion is configured to receive the one or more communication ports.

3. The energy storage system of claim 2, wherein the receiving portion includes one or more terminals and the one or more communication ports include one or more contacts, and wherein the one or more terminals are configured to electrically connect to the one or more contacts.

4. The energy storage system of claim 3, wherein the one or more contacts are electrically connected to the at least one battery cell, and the one or more terminals are electrically connected to an electric motor generator.

5. The energy storage system of claim 3, wherein the one or more contacts includes at least one contact electrically connected to the one or more data links, and wherein the one or more data links are connected to the at least one battery cell.

6. The energy storage system of claim 1, further comprising:
    a compressor, a condenser, an expansion valve, and an evaporator coupled together to form a closed refrigeration circuit, wherein the evaporator is in fluid communication with the liquid inside the container, and wherein the condenser is in fluid communication with the secondary medium outside the container.

7. The energy storage system of claim 1, further comprising: one or more cooling fins on an outside surface of the container.

8. The energy storage system of claim 1, wherein the liquid is electrically insulative and thermally conductive.

9. The energy storage system of claim 6, wherein the secondary medium is air, and wherein the condenser has condenser cooling fins and a fan is configured to direct a flow of air across the condenser cooling fins.

10. The energy storage system of claim 9, further comprising:
    an inlet and an outlet defined by the container, wherein the inlet and outlet are in fluid communication with the liquid in the container;
    a fluid transport line coupled to the inlet and the outlet, wherein the fluid transport line defines a flow path outside the container, wherein the flow path is configured to pass the liquid from the outlet to the inlet.

11. The energy storage system of claim 10, further comprising:
    a heat exchanger positioned outside the container, wherein the transport line is coupled to the heat exchanger, and wherein the flow path passes through the heat exchanger before passing to the inlet.

12. The energy storage system of claim 11, wherein the heat exchanger includes one or more cooling fins and a fan operable to direct a flow of air across the cooling fins.

13. The energy storage system of claim 1, further comprising:
a cover included with the container; and
a sealing member positioned between the cover and the at least one wall of the container.

14. The energy storage system of claim 13, wherein the container is hermetically sealed.

15. The energy storage system of claim 1,
wherein the sensor is configured to measure a battery temperature of the at least one battery cell.

16. The energy storage system of claim 1,
wherein the sensor is configured to measure a liquid temperature of the liquid.

17. The energy storage system of claim 1, wherein the at least one battery cell is part of a battery cell array that includes multiple battery cells.

\* \* \* \* \*